(12) United States Patent
Kim et al.

(10) Patent No.: US 8,805,172 B2
(45) Date of Patent: Aug. 12, 2014

(54) CONTENTS REPRODUCING METHOD AND APPARATUS FOR ADJUSTING CONTENTS REPRODUCING TIME BASED ON USER PREFERENCE INFORMATION

(75) Inventors: Sun-bal Kim, Suwon-si (KR); Hyung-tak Choi, Suwon-si (KR); In-chul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 12/488,622

(22) Filed: Jun. 22, 2009

(65) Prior Publication Data

US 2010/0124400 A1      May 20, 2010

(30) Foreign Application Priority Data

Nov. 14, 2008   (KR) .................. 10-2008-0113348

(51) Int. Cl.
*H04N 5/91*      (2006.01)
(52) U.S. Cl.
USPC ........................................... 386/343

(58) Field of Classification Search
CPC ................................. H04N 5/00; H04N 5/783
USPC .......................................... 386/200, 241, 343
See application file for complete search history.

(56) References Cited

U.S. PATENT DOCUMENTS

| 7,043,136 B2 * | 5/2006 | Kani et al. ..................... 386/278 |
| 7,054,547 B1 * | 5/2006 | Abecassis ..................... 386/282 |
| 7,336,886 B2 * | 2/2008 | Hsi ................................ 386/343 |
| 7,663,048 B2 * | 2/2010 | Kaburagi et al. ............... 84/609 |
| 7,664,882 B2 * | 2/2010 | Mohammed et al. ......... 709/250 |

* cited by examiner

*Primary Examiner* — Huy T Nguyen
(74) *Attorney, Agent, or Firm* — Sughrue Mion, PLLC

(57) ABSTRACT

A contents reproducing method and apparatus for adjusting a contents reproducing time are provided. The method includes: receiving a target reproducing time and user preference information, the user preference information including at least one of user preferred contents sections or scenes from an external source; obtaining contents reproducing data for adjusting a reproducing speed of the contents based on the target reproducing time and the user preference information; and adjusting the reproducing speed of the contents based on the reproducing data.

33 Claims, 3 Drawing Sheets

CONTENTS REPRODUCING METHOD AND APPARATUS FOR ADJUSTING CONTENTS REPRODUCING TIME BASED ON USER PREFERENCE INFORMATION

CROSS-REFERENCE TO RELATED PATENT APPLICATION

This application claims the benefit of Korean Patent Application No. 10-2008-0113348, filed on Nov. 14, 2008, in the Korean Intellectual Property Office, the disclosure of which is incorporated herein in its entirety by reference.

BACKGROUND OF THE INVENTION

1. Field of the Invention

The present invention relates to a contents reproducing method, and more particularly, to a contents reproducing method and apparatus for adjusting a contents reproducing speed based on a target reproducing time and user preference information.

2. Description of the Related Art

Due to the availability of various portable media players (PMP), personalized and customized methods of reproducing moving picture files are required, instead of uniform and passive methods of reproducing moving picture files.

In a general method of reproducing moving picture files, a reproducing speed is adjusted by changing the speed to be high or low at a specific point of time. However, in such a method of reproducing by changing speed, a user's preference, that is, user preferred scenes or sections in the moving picture file, may be reflected while the user directly reproduces the moving picture file. In addition, the conventional method of reproducing moving picture files cannot adjust the reproducing speed of an entire moving picture film, in consideration of a target reproducing time.

Accordingly, a contents reproducing method, in which metadata obtained by objectively analyzing the contents of moving picture files is used to consider the target reproducing time based on user preference information and which is thereby used to adjust the reproducing time, is required.

SUMMARY OF THE INVENTION

The present invention provides a contents reproducing method and apparatus for adjusting a contents reproducing speed based on a target reproducing time and user preference information.

According to an aspect of the present invention, there is provided a contents reproducing method for adjusting a contents reproducing time, the method including: receiving a target reproducing time and user preference information, the user preference information including information regarding at least one of user preferred contents sections or scenes from an external source; obtaining reproducing data for adjusting a reproducing speed of the contents based on the target reproducing time and the user preference information; and adjusting the reproducing speed of the contents based on the reproducing data.

The obtaining of the reproducing data may include: transmitting the target reproducing time and the user preference information to a server on a network; and receiving, from the server, the reproducing data, as generated by the server based on the target reproducing time and the user preference information or receiving default reproducing data with respect to the contents.

The obtaining of the reproducing data may include: receiving default reproducing data with respect to the contents from the server on the network; and altering the reproducing data based on the target reproducing time and the user preference information.

The information regarding the contents scenes included in the user preference information may include: a user preferred genre. The information regarding the contents sections included in the user preference information may include a priority order of each section, the contents of which are classified by at least one from among a time data and a frame data.

The reproducing data may include the priority order, the genre, and the reproducing speed of a section based on a priority order of the user preferred genre in the user preference information and a priority order of the section included in the user preference information.

The adjusting of the reproducing speed of the contents may include: reproducing contents at normal speed in a section corresponding to the user preferred genre included in the user preference information and reproducing the contents at a high speed, in consideration of the target reproducing time in a section which does not correspond to the user preferred genre included in the user preference information; or reproducing the contents at high speed in all sections of the contents, in consideration of the target reproducing time.

The adjusting of the reproducing speed of the contents may include: reproducing the contents at normal speed in a section where the priority order of the user preference information is high and reproducing the contents at a high speed, in consideration of the target reproducing time, in a section where the priority order of the user preference information is low; or reproducing the contents at high speed in all sections of the contents, in consideration of the target reproducing time.

The reproducing data may be described using at least one of Extensible Markup Language (XML), metadata of TV-Anytime standard, and Synchronized Media Integration Language (SMIL).

The transmitting of the target reproducing time and the user preference information to the server and the receiving of the reproducing data from the server may be performed using Hypertext Transfer Protocol (HTTP) or Real-time Transport Protocol (RTP).

According to an aspect of the present invention, there is provided a computer readable recording medium having embodied thereon a computer program for executing the method above.

According to an aspect of the present invention, there is provided contents reproducing apparatus for adjusting a contents reproducing time, the apparatus including: a user preference information input unit receiving a target reproducing time and user preference information, the user preference information including information regarding at least one of user preferred contents sections or scenes from an external source; a reproducing data obtaining unit obtaining reproducing data for adjusting a reproducing speed of the contents based on the target reproducing time and the user preference information; and a reproducing unit adjusting the reproducing speed of the contents based on the reproducing data.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
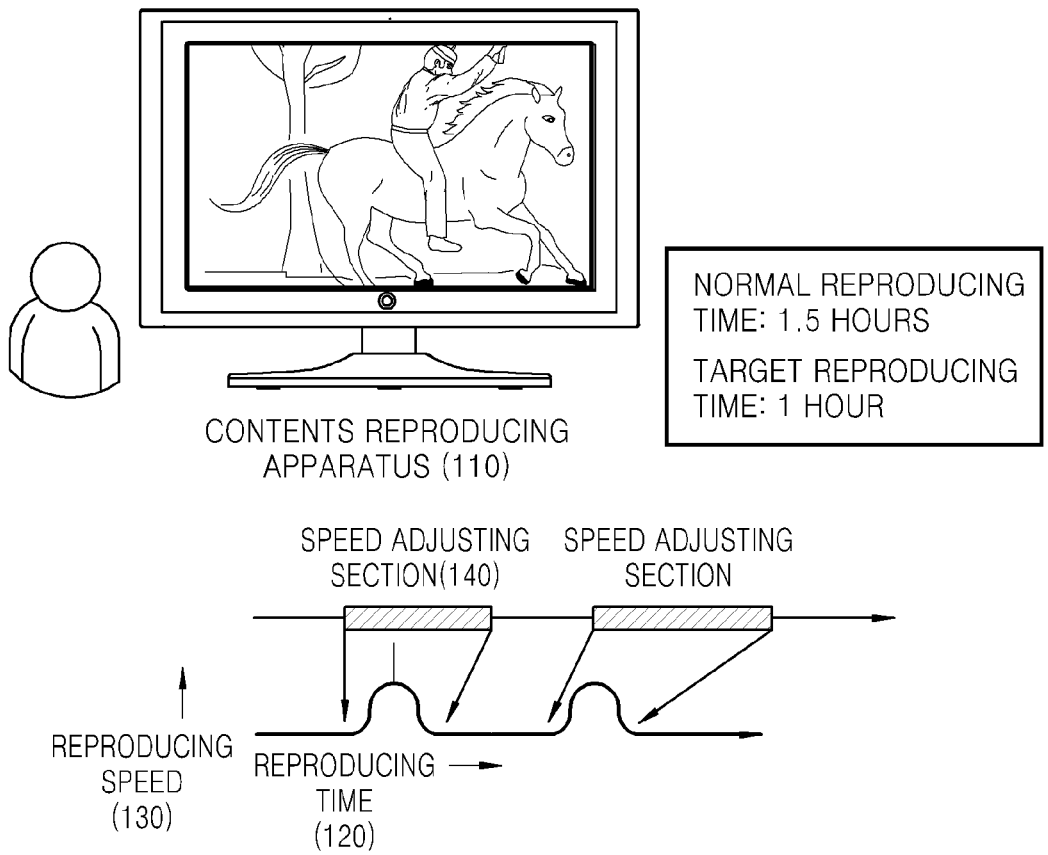
FIG. 1 schematically illustrates a reproduction service for adjusting a reproducing time based on a target reproducing time according to an embodiment of the present invention.

Hereinafter, the present invention will be described more fully with reference to the accompanying drawings, in which exemplary embodiments of the invention are shown. In the drawings, like reference numerals denote like elements, and the sizes and thicknesses of layers and regions are exaggerated for clarity.

FIG. 1 schematically illustrates a reproduction service for adjusting a reproducing time based on a target reproducing time according to an embodiment of the present invention.

Referring to FIG. 1, it is assumed that a normal reproducing time for provided contents to be reproduced in a contents reproducing apparatus 110 is 1.5 hours.

According to the present embodiment, when a user considers a target reproducing time of the contents to be 1 hour, the contents reproducing apparatus 110 firstly receives the target reproducing time from the user.

Also, the contents reproducing apparatus 110 receives user preference information including information regarding user preferred contents sections or scenes from the user and the contents reproducing apparatus 110 transmits the target reproducing time and the user preference information to a server (not shown) on a network.

The server generates reproducing data based on the target reproducing time and the user preference information or generates default reproducing data with respect to the contents, and transmits the reproducing data to the contents reproducing apparatus 110.

The contents reproducing apparatus 110 adjusts the reproducing speed of the contents based on the reproducing data and thus, reproduces the contents based on the target reproducing time. In other words, the user preferred contents sections or scenes are taken into account in the contents reproducing apparatus 110 and the reproducing speed of contents may be adjusted for each section or scene based on the target reproducing time. A speed adjusting section 140 of FIG. 1 denotes a section whose reproducing speed is to be adjusted based on the target reproducing time.

According to an embodiment of the present invention, a personalized and customized reproducing method of reproducing moving picture files used in various portable media players (PMP) may be provided, instead of a uniform and passive method of reproducing moving picture files. The reproducing method according to the present embodiment may be applied to various reproducing apparatuses such as Video on Demand (VoD) support devices, Internet Protocol televisions (IPTVs), and MP3 players, thereby providing the personalized and customized reproducing method.

Moreover, according to another embodiment, when the user considers the target reproducing time of the contents to be 1 hour, the contents reproducing apparatus 110 firstly receives the target reproducing time from the user.

Also, the contents reproducing apparatus 110 receives user preference information including information regarding user preferred contents sections or scenes from the user.

The contents reproducing apparatus 110 receives default reproducing data with respect to the contents from a server (not shown) on a network and alters the reproducing data based on the target reproducing time and the user preference information.

The contents reproducing apparatus 110 adjusts the reproducing speed of the contents by using the altered reproducing data, thereby reproducing the contents based on the target reproducing time. In other words, information regarding the user preferred contents sections or scenes is taken into account in the contents reproducing apparatus 110 and the reproducing speed of contents may be adjusted for each scene or section based on the target reproducing time. The speed adjusting section 140 of FIG. 1 denotes a section whose reproducing speed is to be adjusted based on the target reproducing time.

According to another embodiment of the present invention, a personalized and customized reproducing method of reproducing moving picture files, in which a load on the server is reduced, used in various PMPs may be provided. The reproducing method according to the present embodiment may be applied to various reproducing apparatus such as VoD support devices, IPTVs, and MP3 players, thereby providing the personalized and customized reproducing method.

Figure 2:
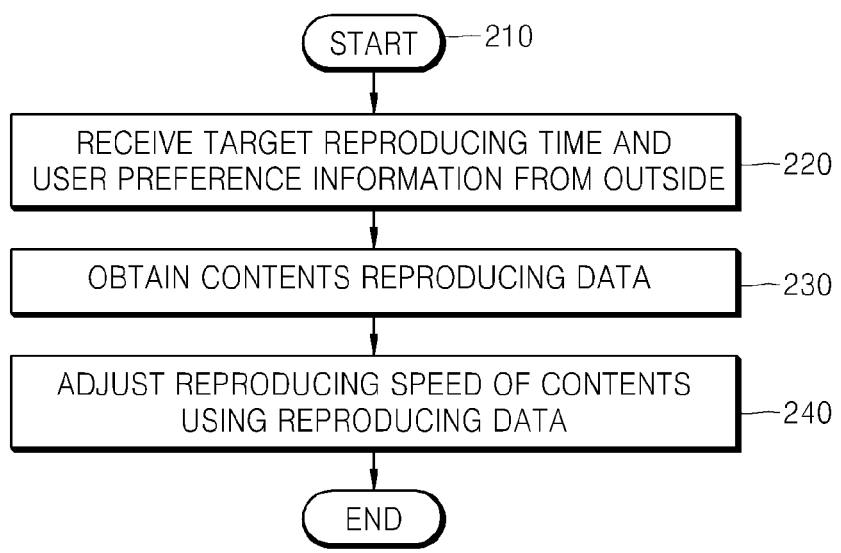
FIG. 2 is a flowchart illustrating a method of adjusting a reproducing time based on a target reproducing time according to an embodiment of the present invention.

FIG. 2 is a flowchart illustrating a method of adjusting a reproducing time based on the target reproducing time.

In operation 220, the contents reproducing apparatus 110 receives the target reproducing time and the user preference information, the user preference information including information regarding user preferred contents sections or scenes from an external source. The information regarding user preferred contents scenes included in the user preference information includes at least a user preferred genre. The information regarding the contents sections included in the user preference information includes a priority order of each section, the contents of which are classified by at least one from among a time data and a frame data. For example, the priority order may be specified to be, from highest order to lowest order, a highlight section, a checkpoint section, to a skip section. The designation as a highlight section denotes a section containing the most important scenes of the contents. The designation as a checkpoint section does not denote a section containing the most important scenes of the contents but denotes a section which should be reproduced for understanding the flow of the contents. The designation as a skip section denotes a section capable of being skipped entirely.

In operation 230, the contents reproducing apparatus 110 obtains the contents reproducing data for adjusting the reproducing speed of the contents based on the target reproducing time and the user preference information. The reproducing data is data in which the priority order, the genre, and the reproducing speed of a section are described based on a priority order of the user preferred genre in the user preference information and a priority order of the section included in the user preference information.

According to an embodiment, in the obtaining of the reproducing data, the target reproducing time and the user preference information are transmitted to a server on a network and reproducing data, as generated by the server based on the target reproducing time and the user preference information, is received. In addition, in the obtaining of the reproducing data, default reproducing data with respect to the contents may be received from the server.

According to another embodiment, in the obtaining of the reproducing data, default reproducing data with respect to the contents is received from the server and the contents reproducing apparatus 110 alters the reproducing data based on the target reproducing time and the user preference information. The contents reproducing apparatus 110 may alter the reproducing data based on a remaining reproducing time during the reproducing the contents.

In both embodiments, the reproducing data may be described using at least one of Extensible Markup Language (XML), metadata of the TV-Anytime standard, and Synchronized Media Integration Language (SMIL), but may be also described using other languages. In addition, the contents reproducing apparatus 110 may communicate with the server by using Hypertext Transfer Protocol (HTTP) or Real-time Transport Protocol (RTP). However, other protocols may be also used.

In operation 240, the contents reproducing apparatus 110 adjusts the reproducing speed of the contents by using the reproducing data. In the adjusting of the reproducing speed of the contents, the information regarding user preferred contents sections or scenes may be taken into account and the contents may be reproduced by adjusting the reproducing speed for each section or scene based on the target reproducing time. For example, when the reproducing speed of the contents is adjusted by reflecting the user preferred contents sections, the contents reproducing apparatus 110 reproduces the contents at normal speed in a section where the priority order for the section included of the user preference information is high and reproduces the contents at a high speed, in consideration of the target reproducing time, in a section where the priority order for the section included of the user preference information is low. Thus, the contents reproducing apparatus 110 may reproduce the contents based on the target reproducing time. In addition, the contents reproducing apparatus 110 reproduces the contents at high speed in all sections of the contents, in consideration of the target reproducing time, thereby reproducing the contents based on the target reproducing time.

When the reproducing speed of the contents is adjusted by reflecting the user preferred contents scenes, the contents reproducing apparatus 110 reproduces the contents at normal speed in a section corresponding to the user preferred genre included in the user preference information. In a section which does not correspond to the user preferred genre included in the user preference information, the contents reproducing apparatus 110 reproduces the contents at a high speed in consideration of the target reproducing time and thus, contents may be reproduced based on the target reproducing time. In addition, the contents reproducing apparatus 110 reproduces the contents at high speed in all sections of the contents, in consideration of the target reproducing time, thereby reproducing the contents based on the target reproducing time.

Figure 3:
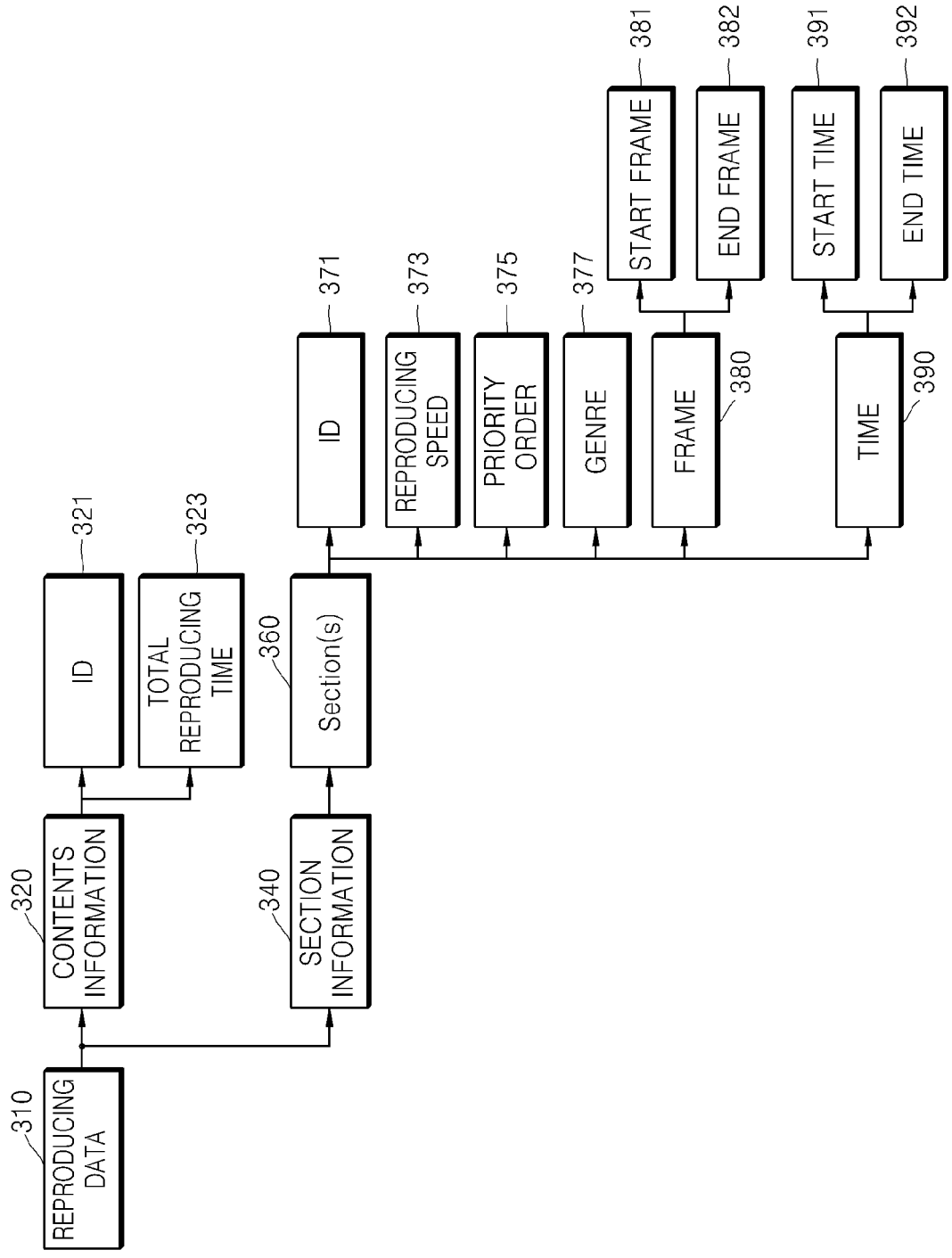
FIG. 3 is a block diagram of reproducing data according to an embodiment of the present invention.

FIG. 3 is a block diagram of reproducing data according to an embodiment of the present invention. The reproducing data according to the present embodiment may be described using XML, metadata of the TV-Anytime standard, and SMIL, but may be also described using other languages.

The reproducing data is mainly formed of information in a contents unit and information in a section unit. The information in the contents unit includes contents ID and a total reproducing time when reproducing the contents at normal speed.

The information in the section unit includes, for each section, a section ID, a reproducing speed, a priority order, a genre, frames respectively indicating the start and the end of the section, and times respectively indicating the start and the end of the section. For example, the genre may be one of horror, war, melodrama, and etc. The priority order may be described to be, from highest order to lowest order, a highlight section, a checkpoint section to a skip section. The designation as a highlight section denotes a section containing the most important scenes of the contents. The designation as a checkpoint section does not denote a section containing the most important scenes of the contents but denotes a section which should be reproduced for understanding the flow of the contents. The designation as a skip section denotes a section capable of being skipped from the scenes of the contents.

The target reproducing time and the user preference information including information regarding user preferred contents sections or scenes are taken into account and the reproducing data may be as generated in the contents reproducing apparatus 110 or the server.

Figure 4:
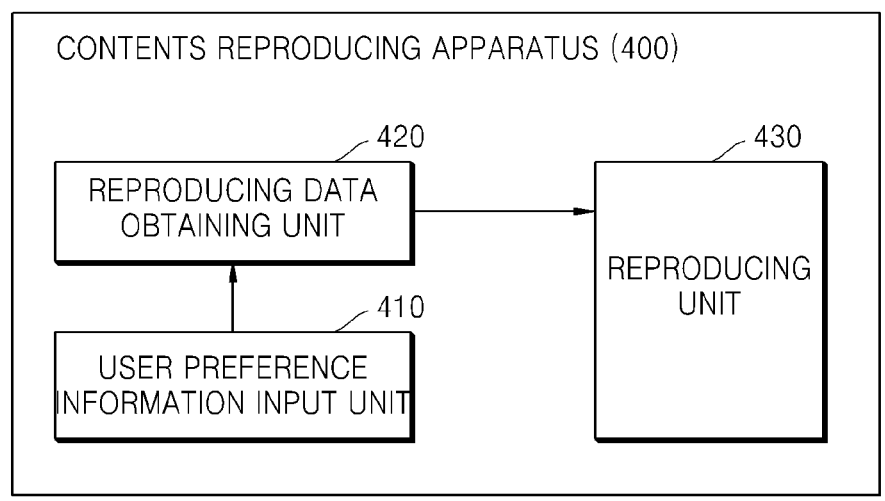
FIG. 4 is a block diagram of a contents reproducing apparatus for adjusting a reproducing time based on a target reproducing time according to an embodiment of the present invention.

FIG. 4 is a block diagram of a contents reproducing apparatus 400 for adjusting a reproducing time based on a target reproducing time according to an embodiment of the present invention. Referring to FIG. 4, the contents reproducing apparatus 400 includes a user preference information input unit 410, a reproducing data obtaining unit 420, and a reproducing unit 430.

The user preference information input unit 410 receives the target reproducing time and the user preference information including information regarding the user preferred contents sections or scenes from an external source. The information regarding the user preferred contents scenes included in the user preference information includes at least a user preferred genre. Also, the information regarding the user preferred contents sections included in the user preference information includes a priority order of each section, the contents of which are classified by at least one from among time data and frame data.

The reproducing data obtaining unit 420 obtains the contents reproducing data for adjusting the reproducing speed of the contents based on the target reproducing time and the user preference information. The reproducing data is data in which the priority order, the genre, and the reproducing speed of a section are described based on a priority order of the user preferred genre in the user preference information and a priority order of the section included in the user preference information.

According to the present embodiment, the reproducing data obtaining unit 420 includes a user preference information transmitting unit (not shown) and a reproducing data receiving unit (not shown). The user preference information transmitting unit may transmit the target reproducing time and the user preference information to a server on a network. The reproducing data receiving unit may receive the reproducing data as generated by the server based on the target reproducing time and the user preference information. Also, the reproducing data receiving unit may receive, from the server, default reproducing data with respect to the contents.

According to another embodiment, the reproducing data obtaining unit 420 includes a reproducing data receiving unit (not shown) and a reproducing data altering unit (not shown). The reproducing data receiving unit may receive default reproducing data with respect to the contents from the server on the network.

The reproducing data altering unit may alter the reproducing data in the contents reproducing apparatus 400 based on the target reproducing time and the user preference information. In addition, the reproducing data altering unit may alter the reproducing data based on a remaining reproducing time during the reproducing the contents In both embodiments, the reproducing data may be described using at least one of XML, metadata of the TV-Anytime standard, and SMIL. In addition, the contents reproducing apparatus 110 may communicate with the server by using HTTP or RTP.

The reproducing unit 430 adjusts the reproducing speed of the contents by using the reproducing data and thus reproduces the contents based on the target reproducing time. The reproducing unit 430 may adjust the reproducing speed for each section or scene based on the target reproducing time and reproduces the contents based on the information regarding the user preferred contents sections or scenes.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.) and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A contents reproducing method for adjusting a contents reproducing time, the method comprising:
    receiving, from an external source, a target reproducing time provided by a user and user preference information, the user preference information comprising information regarding at least two sections or scenes in the contents labeling each of the at least two sections or scenes as user preferred contents section or scene or as not user preferred contents section or scene;
    obtaining contents reproducing data for adjusting a reproducing speed of the contents based on the target reproducing time and the user preference information; and
    adjusting by a computer the reproducing speed of the contents based on the reproducing data by reproducing the contents at normal speed in user preferred contents sections and reproducing the contents at a high speed in sections which are not the user preferred contents sections,
    wherein the high speed in the sections which are not the user preferred contents sections is set based on the target reproducing time provided by the user, which identifies time in which the user is to watch the contents which comprises both the user preferred contents sections and the sections which are not the user preferred contents sections.

2. The method of claim 1, wherein the obtaining of the reproducing data comprises:
    transmitting the target reproducing time and the user preference information to a server on a network; and
    receiving the reproducing data, as generated by the server based on the target reproducing time and the user preference information or receiving default reproducing data with respect to the contents, from the server.

3. The method of claim 1, wherein the obtaining of the reproducing data comprises:
    receiving default reproducing data with respect to the contents from a server on a network;
    altering the reproducing data based on the target reproducing time and the user preference information.

4. The method of claim 1, wherein information regarding the contents scenes included in the user preference information comprises at least a user preferred genre and wherein information regarding the contents sections included in the user preference information comprise, for at least one section, a priority order of the section whose contents are classified by at least one from among a time data and a frame data.

5. The method of claim 4, wherein the reproducing data comprises the priority order, the genre, and the reproducing speed for a section which are based on the priority order of the user preferred genre in the user preference information and a priority order of the section included in the user preference information.

6. The method of claim 5, wherein the adjusting of the reproducing speed of the contents comprises:
    reproducing contents at a normal speed in a section corresponding to the user preferred genre included in the user preference information and reproducing the contents by adjusting the reproducing speed to be high in consideration of the target reproducing time in a section, which does not correspond to the user preferred genre included in the user preference information; or
    reproducing the contents at a high speed in each section of the contents, in consideration of the target reproducing time.

7. The method of claim 5, wherein the adjusting of the reproducing speed of the contents comprises:
    reproducing the contents at a normal speed in a section where the priority order of the user preference information is high and reproducing the contents by adjusting the reproducing speed to be high, in consideration of the target reproducing time, in a section where the priority order of the user preference information is low; or
    reproducing the contents at a high speed in each section of the contents, in consideration of the target reproducing time.

8. The method of claim 1, wherein the reproducing data is described using at least one of Extensible Markup Language (XML), metadata of TV-Anytime standard, and Synchronized Media Integration Language (SMIL).

9. The method of claim 2, wherein the transmitting of the target reproducing time and the user preference information to the server and the receiving of the reproducing data from the server are performed using Hypertext Transfer Protocol (HTTP) or Real-time Transport Protocol (RTP).

10. The method of claim 1, wherein the user preference information is input by the user and ranks the at least two sections as the user preferred contents section or scene or as the not user preferred contents section or scene and wherein the high speed is set based on the target reproducing time and based on a number and length of sections or scenes in the contents designated as user preferred and as not user preferred.

11. The method of claim 1, wherein the user preference information identifies at least one of the user preferred contents sections or scenes that are to be skipped during the reproduction of the contents.

12. The method of claim 1, wherein the adjusting the reproducing speed of the contents comprises customizing the reproduction speed of the contents based on user input comprising the target reproduction time for the contents and the user preference information which indicates priorities for said at least one of user preferred contents sections or scenes as identified by the user.

13. The method of claim 12, wherein the priorities indicates which of sections or scenes in the contents to skip and which to display at a slower reproduction rate from the remaining contents.

14. A contents reproducing apparatus for adjusting a contents reproducing time, the apparatus comprising:
    a user preference information input unit which receives, from an external source, a target reproducing time provided by a user and user preference information, the user preference information comprising information regarding at least two sections or scenes in the contents labeling each of the at least two sections or scenes as user preferred contents section or scene or as not user preferred contents section or scene;
    a reproducing data obtaining unit which obtains contents reproducing data for adjusting a reproducing speed of the contents based on the target reproducing time and the user preference information; and
    a reproducing unit which adjusts the reproducing speed of the contents based on the reproducing data by reproducing the contents at normal speed in user preferred contents sections or scenes and reproducing the contents at a high speed in sections which are not the user preferred contents sections,
    wherein the reproducing unit sets the high speed in the sections which are not the user preferred contents sections based on the target reproducing time provided by the user, which identifies time in which the user is to watch the contents which comprises both the user preferred contents sections and the sections which are not the user preferred contents sections.

15. The apparatus of claim 14, wherein the reproducing data obtaining unit comprises:
    a user preference information which transmits unit transmitting the target reproducing time and the user preference information to a server on a network;
    a reproducing data receiving unit which receives the reproducing data, as generated by the server based on the target reproducing time and the user preference information or receives default reproducing data with respect to the contents, from the server.

16. The apparatus of claim 14, wherein the reproducing data obtaining unit comprises:
    the reproducing data receiving unit receiving default reproducing data with respect to the contents from the server on the network; and
    a reproducing data altering unit altering the reproducing data based on the target reproducing time and the user preference information.

17. The apparatus of claim 14, wherein the information regarding contents scenes included in the user preference information comprises at least a user preferred genre and wherein the information regarding the contents sections included in the user preference information comprises, for at least one section, a priority order of the section, the contents of which are classified by at least one from among a time data and a frame data.

18. The apparatus of claim 17, wherein the reproducing data comprises the priority order, the genre, and the reproducing speed of a section which is based on the priority order of the user preferred genre in the user preference information and a priority order of the section included in the user preference information.

19. The apparatus of claim 18, wherein the reproducing unit:
    reproduces contents at a normal speed in a section corresponding to the user preferred genre included in the user preference information and reproduces the contents by adjusting the reproducing speed to be high in consideration of the target reproducing time in a section which does not correspond to the user preferred genre included in the user preference information; or
    reproduces the contents at a high speed in each section of the contents, in consideration of the target reproducing time.

20. The apparatus of claim 18, wherein the reproducing unit:
    reproduces the contents at a normal speed in a section where the priority order of the user preference information is high and reproduces the contents by adjusting the reproducing speed to be high, in consideration of the target reproducing time, in a section where the priority order of the user preference information is low; or
    reproduces the contents at a high speed in each section of the contents, in consideration of the target reproducing time.

21. The apparatus of claim 14, wherein the reproducing data is described using at least one of Extensible Markup Language (XML), metadata of TV-Anytime standard, and Synchronized Media Integration Language (SMIL).

22. The apparatus of claim 15, wherein the user preference information transmitting unit and the reproducing data receiving unit operate using Hypertext Transfer Protocol (HTTP) or Real-time Transport Protocol (RTP).

23. A non-transitory computer readable recording medium having embodied thereon a computer program for executing a contents reproducing method for adjusting a contents reproducing time, the method comprising:
    receiving, from an external source, a target reproducing time provided by a user and user preference information, the user preference information comprising information regarding at least two sections or scenes in the contents labeling each of the at least two sections or scenes as user preferred contents section or scene or as not user preferred contents section or scene;
    obtaining contents reproducing data for adjusting a reproducing speed of the contents based on the target reproducing time and the user preference information; and
    adjusting the reproducing speed of the contents based on the reproducing data by reproducing the contents at normal speed in user preferred contents sections or scenes and reproducing the contents at a high speed in sections which are not the user preferred contents sections,
    wherein the high speed in the sections which are not the user preferred contents sections is set based on the target reproducing time provided by the user, which identifies time in which the user is to watch the contents which comprises both the user preferred contents sections and the sections which are not the user preferred contents sections.

24. A contents reproducing method for adjusting a contents reproducing speed based on a target reproducing time and a user preference information, the method comprising:
    receiving the target reproducing time provided by a user and the user preference information, the user preference information including information regarding at least two sections or scenes in the contents labeling each of the at least two sections or scenes as user preferred contents section or as not user preferred contents section or scene;
    obtaining, based on the received target reproducing time and user preference information, reproducing data for adjusting a reproducing speed of the contents;
    reproducing the contents; and during the reproducing of the contents, adjusting by a computer the reproducing speed of the contents based on the reproducing data by reproducing the contents at normal speed in user preferred contents sections or scenes and reproducing the contents at a high speed in sections which are not the user preferred contents sections, wherein the high speed in the sections which are not the user preferred contents sections is set based on the target reproducing time provided by the user, which identifies time in which the user is to watch the contents which comprises both the user preferred contents sections and the sections which are not the user preferred contents sections.

25. The contents reproducing method of claim 24, wherein the obtaining of the reproducing data comprises:

transmitting the target reproducing time and the user preference information to a server on a network; and receiving, from the server, reproducing data, as generated by the server based on the target reproducing time and the user preference information, or receiving default reproducing data with respect to the contents.

26. The contents reproducing method of claim 24, wherein the obtaining of the reproducing data comprises:

receiving default reproducing data with respect to the contents from a server on a network; and altering the reproducing data based on the target reproducing time and the user preference information.

27. The contents reproducing method of claim 24, wherein the contents comprises a plurality of sections, each having a specified genre and wherein the information regarding the user preferred contents scenes included in the user preference information comprises at least one user preferred genre; and the obtained reproducing data includes priority order information for each section, wherein the priority order of a section is based on the genre of the section and the at least one user preferred genre.

28. The contents reproducing method of claim 27, wherein the adjusting of the reproducing speed of the contents comprises:

for a plurality of sections:

reproducing contents of a section having a genre corresponding to the user preferred genre at a normal speed and reproducing contents of a section having a genre other than the user preferred genre at a high speed based on the target reproducing time.

29. The contents reproducing method of claim 27, wherein the adjusting of the reproducing speed of the contents comprises:

reproducing the contents of each section at high speed based on the target reproducing time.

30. The contents reproducing method of claim 24, wherein the contents comprises a plurality of sections and the information regarding the contents sections included in the user preference information comprises a priority order of at least one section.

31. The contents reproducing method of claim 30, wherein the adjusting of the reproducing speed of the contents comprises:

for a plurality of sections:

reproducing the contents at normal speed in a section where the priority order of the section included in the user preference information is high and reproducing the contents at a high speed, in consideration of the target reproducing time, in a section where the priority order of the section included of the user preference information is low.

32. The contents reproducing method of claim 30, wherein the adjusting of the reproducing speed of the contents comprises:

reproducing the contents of each section at high speed based on the target reproducing time.

33. The contents reproducing method of claim 31, wherein the sections are identified in the reproducing data by at least one of a time data and a frame data.

* * * * *